(12) United States Patent
Bilmayer et al.

(10) Patent No.: US 8,690,173 B2
(45) Date of Patent: Apr. 8, 2014

(54) DOUBLE PINION STEERING GEAR

(75) Inventors: Roman Bilmayer, Mauren (LI); Ralf Eckstein, Feldkirch (AT); Rinaldo Buchel, Haldenstein (CH); Steffen Reisacher, Neuffen (DE); Bernd Haussler, Ulm (DE); Kai Vohwinkel, Reichenback (DE)

(73) Assignee: ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 13/809,311

(22) PCT Filed: Jul. 4, 2011

(86) PCT No.: PCT/EP2011/003303
§ 371 (c)(1),
(2), (4) Date: Jan. 9, 2013

(87) PCT Pub. No.: WO2012/010255
PCT Pub. Date: Jan. 26, 2012

(65) Prior Publication Data
US 2013/0113173 A1 May 9, 2013

(30) Foreign Application Priority Data
Jul. 19, 2010 (DE) .......................... 10 2010 027 553

(51) Int. Cl.
*B62D 3/12* (2006.01)
(52) U.S. Cl.
USPC .................................................. 280/93.514
(58) Field of Classification Search
USPC ........... 280/93.514, 93.513, 93.515; 180/427, 180/428; 74/422, 424.6
See application file for complete search history.

(56) References Cited

U.S. PATENT DOCUMENTS 7,309,073 B2 * 12/2007 Nishiko .................... 280/93.514
2007/0216125 A1 * 9/2007 Baxter ...................... 280/93.514

FOREIGN PATENT DOCUMENTS

| DE | 4446482 C1 | 1/1996 |
| DE | 10341266 A1 | 5/2004 |
| DE | 102005022867 A1 | 12/2005 |
| DE | 102007004218 A1 | 9/2008 |
| JP | 58110373 A | 6/1983 |
| WO | WO-2006138209 A2 | 12/2006 |

OTHER PUBLICATIONS

International Preliminary Report on Patentability issued in PCT/EP2011/003303, on Jan. 22, 2013.

(Continued)

*Primary Examiner* — Faye M. Fleming
(74) *Attorney, Agent, or Firm* — Novak Druce Connolly Bove + Quigg LLP

(57) ABSTRACT

The invention relates to a motor vehicle steering system, comprising a steering housing (7) in which a steering rack (6) is mounted in a longitudinally displaceable manner and is connected to tie rods (8) to swivel steerable wheels (9), the steering rack (6) being provided with a first toothed segment (5) which meshes with a first steering pinion (4) and the steering pinion (4) being connected to a steering wheel (1) for conjoint rotation by a steering shaft (2, 3), the steering rack (6) having a second toothed segment (13) which is opposite the first toothed segment (4) relative to the longitudinal axis of the steering rack (6), and that a second steering pinion (12) is provided which meshes with the second toothed segment (13).

17 Claims, 4 Drawing Sheets

(56) References Cited

OTHER PUBLICATIONS

Anonymous: "Second pinion assist for electric power steering", Research Disclosure, Mason Publications, Hampshire, GB, vol. 354, No. 25, Oct. 1, 1993, XP007119361, ISSN: 0374-4353 the whole document.

International Search Report and Written Opinion issued in PCT/EP2011/003303, mailed Oct. 24, 2011 with English translation of Search Report.

* cited by examiner

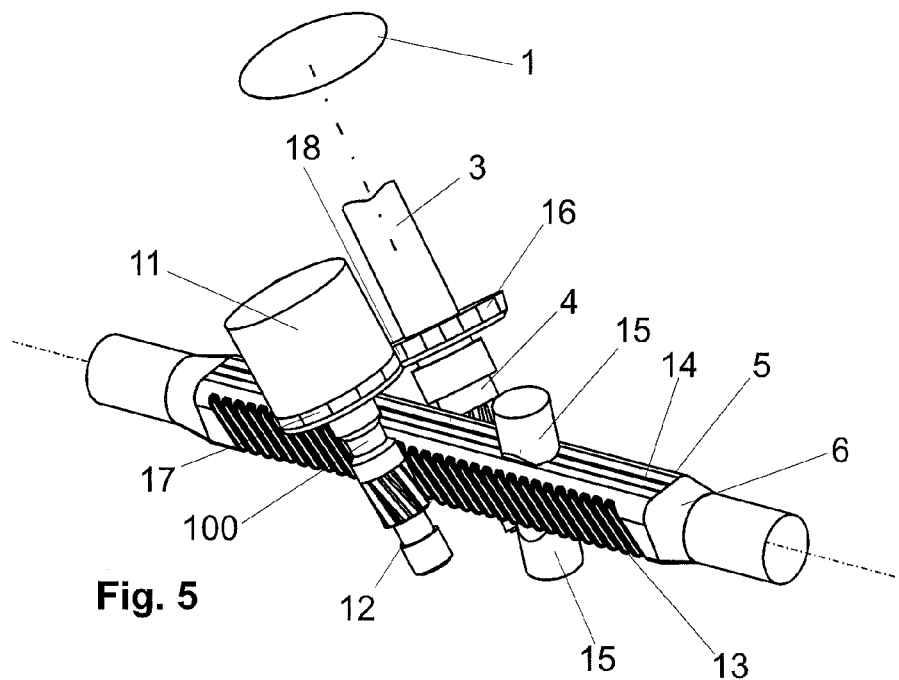
Fig. 5
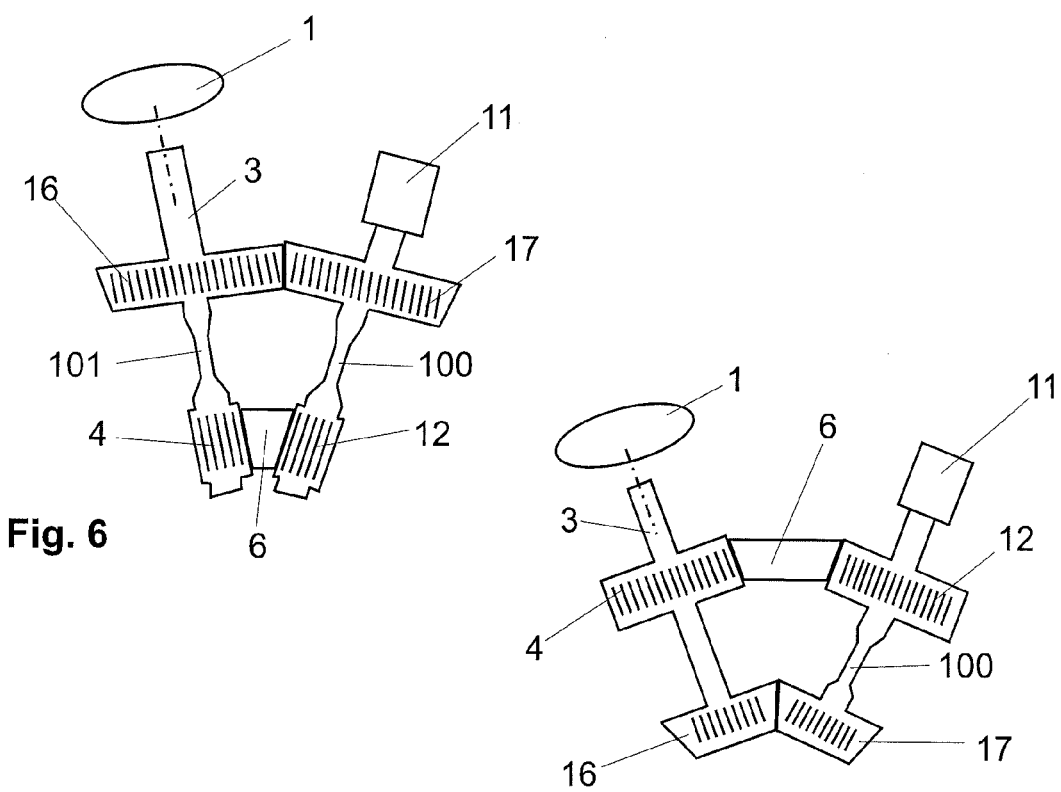
Fig. 6
Fig. 7

DOUBLE PINION STEERING GEAR

CROSS-REFERENCE TO RELATED APPLICATIONS

This Application is a National Stage of PCT International Application No. PCT/EP2011/003303, filed on Jul. 4, 2011, and claims priority of German Patent Application No. 10 2010 027553.0, filed on Jul. 19, 2010. The disclosures of the aforementioned applications are incorporated herein in their entirety by reference.

The present invention relates to a steering gear for motor vehicles having the features of the preamble of claim 1.

At present, electrically assisted steering gears for motor vehicles can be divided into two groups. The first group contains steering gears for which both the manually applied steering moment as well as the assisting moment are introduced into the steering rack via a pinion. In so doing, the servo drive engages on the steering shaft, more specifically either in the region of the upper steering shaft or in the vicinity of the steering pinion. This type of construction is only suitable for relatively light-weight motor vehicles, since for these vehicles (small cars, compact cars) the necessary steering moments are fairly small. A steering gear of this type is not suitable for larger and heavier motor vehicles. The torques which are to be transferred in the region of the pinion become too great to be transferrable via one engagement means. Furthermore, steering pinions cannot be configured in any desired size, because the diameter of the steering pinion also influences the transmission ratio of the steering gear.

Therefore, for vehicles of the so-called middle class and luxury class and for off-road vehicles, a construction of the electric power steering is preferred in which the assisting force is introduced into the steering rack via a second tooth system. Here, steering gears are known in which the servo drive acts on the steering rack via a second steering pinion and a second tooth system. Steering gears of this type are disclosed in Offenlegungsschrift DE 102005022867 A1, DE 102007004218 A1 and WO 2006/138209 A2. These steering gears have a relatively large construction volume, because the servo drive is provided separately next to the engagement between steering pinion and steering rack. Furthermore, steering gears are known from WO 2006/138209 A2 mentioned above, in which a ball screw which is connected to a servomotor by a ball screw drive is provided on the steering rack next to the engagement of the steering pinion. In this case, the steering assisting force is introduced into the steering rack via the ball screw. As a result, the load on the pinion is reduced. Steering gears with a ball screw drive acting on the steering rack are relatively expensive.

An additional factor in both types of construction which have been mentioned is that the guidance of the steering rack in the region of the steering pinion via a pressure piece has to be maintained free from backlash. This mounting is also associated with production costs and, in practice, constitutes a possible source of noise which is undesirable. For example, DE10341266A1 discloses a steering gear with a drive of the steering rack by two pinions which are arranged on opposite sides of the steering rack. The pinions engage in two toothed segments which are also opposite one another in respect of the longitudinal axis of the steering rack, but are spaced apart by such an extent in the axial direction of the steering rack that they do not overlap one another. Therefore, the pinions cannot be supported against one another. In this steering gear, one pressure piece is required for each pinion, i.e. a total of two pressure pieces is required.

It is therefore the object of the present invention to provide a steering gear which is cheap to produce, has compact dimensions and can nevertheless provide the steering assisting forces required for heavy motor vehicles.

This object is achieved by a steering gear having the features of claim 1.

Since in the case of a motor vehicle steering system having a steering housing in which a steering rack is mounted in a longitudinally displaceable manner and is configured to swivel steerable wheels, the steering rack having a first toothed segment meshing with a first steering pinion and the steering pinion being connected to a steering wheel for conjoint rotation via a steering shaft, the steering rack has two mutually opposite tooth systems relative to the longitudinal axis of the rack, and since two steering pinions are provided which engage on opposite toothed segments and are mechanically positively coupled for joint but opposite rotation, it is possible for double the torque to be transmitted with the same pinion diameter as for a conventional power steering with only one steering pinion, the production costs being only slightly higher. The additional tooth system which is provided opposite the tooth system, connected to the steering wheel, with respect to the longitudinal axis and which overlaps, preferably congruently in the axial direction also makes it possible to omit an expensive pressure piece in the form known hitherto.

When the first steering pinion is mechanically positively coupled with the second steering pinion for opposite rotation in a power flow which acts independently of the steering rack, at least one spring element being arranged between the first pinion and the second pinion, zero backlash can be achieved via the positive coupling and the spring element, without the disadvantages of a mechanical over-determination arising. The torques which occur can thereby be suitably distributed onto the pinions. The spring element is preferably a torsion spring. In this respect, the torsion spring can easily be formed in the shaft for driving at least one of the pinions by a portion which is less torsionally rigid compared to the adjoining shaft portions.

In a steering system of this type, the servo drive, preferably an electric motor can engage on the steering shaft, on the steering pinion connected to the steering shaft, or on the second steering pinion. The two steering pinions can be coupled by spur gears or bevel gears, so that a positive coupling with a fixed rotation angle relation is possible.

It is particularly preferred if the axes of rotation of the two mutually opposite pinions are arranged at an acute angle to one another and if the two steering rack segments which are opposite one another on the steering rack with respect to the longitudinal axis are arranged in mutually inclined planes, because in this way it is possible to achieve zero backlash of the tooth engagements by a pretensioning of the steering rack into the enclosed angle.

Furthermore, if the steering rack has at least one guide in the region of the toothed segments which cooperates with at least one guide element to guide the steering rack in the direction of the axes of rotation, arranged parallel or at an acute angle to one another, of the steering pinions, the steering pinions remain virtually free from axial forces, the backlash can be adjusted and the steering rack is guided in a precise manner.

In the following, an embodiment of the present invention will be described in detail with reference to the drawings, in which:

FIG. 5 shows a steering gear similar to FIG. 3 with an additional spring element in the servomotor shaft;

FIG. 6 is a schematic illustration of a steering gear, in which a respective spring element is arranged in the power flow between the two bevel gears and the pinions, viewed in the longitudinal direction of the steering rack; and FIG. 7 shows a steering gear in a view as in FIG. 6, a spring element being provided only between one pinion and one bevel gear.

Figure 1:
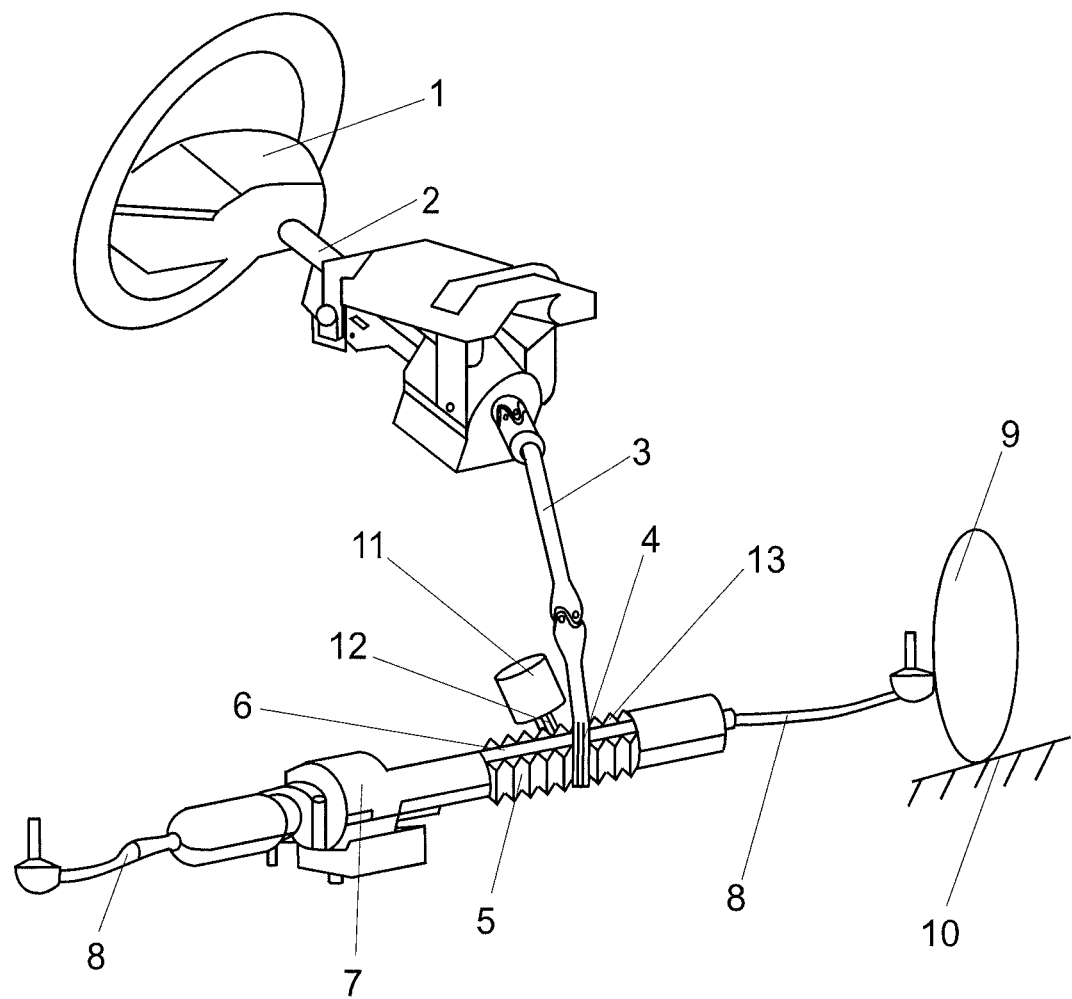
FIG. 1 is a perspective view of a motor vehicle steering system with two mutually opposite driving pinions.

FIG. 1 shows a steering system for a motor vehicle comprising a steering wheel 1 which is coupled for conjoint rotation with an upper steering shaft 2 and lower steering shaft 3. In turn, the lower steering shaft 3 is coupled for conjoint rotation with a first steering pinion 4. The steering pinion 4 meshes in a known manner with a toothed segment 5 of a steering rack 6. The steering rack 6 is mounted in a steering housing 7 such that it can move in the direction of its longitudinal axis. At its free ends, the steering rack 6 is connected to tie rods 8 by ball-and-socket joints (not shown). The tie rods 8 themselves are connected in a known manner by steering knuckles to a respective steered wheel 9 of the motor vehicle. Turning the steering wheel 1 results in a longitudinal displacement of the steering rack 6, via the connection of the steering shafts 2 and 3 and of the pinion 4, and thereby results in a swivelling of the steered wheels 9. The steering shaft 2 and/or steering shaft 3 can be formed by a plurality of shaft portions which are interconnected by, for example, joints and/or telescopic connections and/or dampers. Over a carriageway 10, the steered wheels 9 experience a reaction which counteracts the steering movement. Thus, to swivel the wheels 9, a force is required which necessitates a corresponding torque on the steering wheel 1. A servomotor 11 is provided to assist the driver during this steering movement. The servomotor 11 introduces a steering assisting force into the steering rack 6 via a second steering pinion 12 and a second toothed segment 13 subject to a control (not shown).

Figure 2:
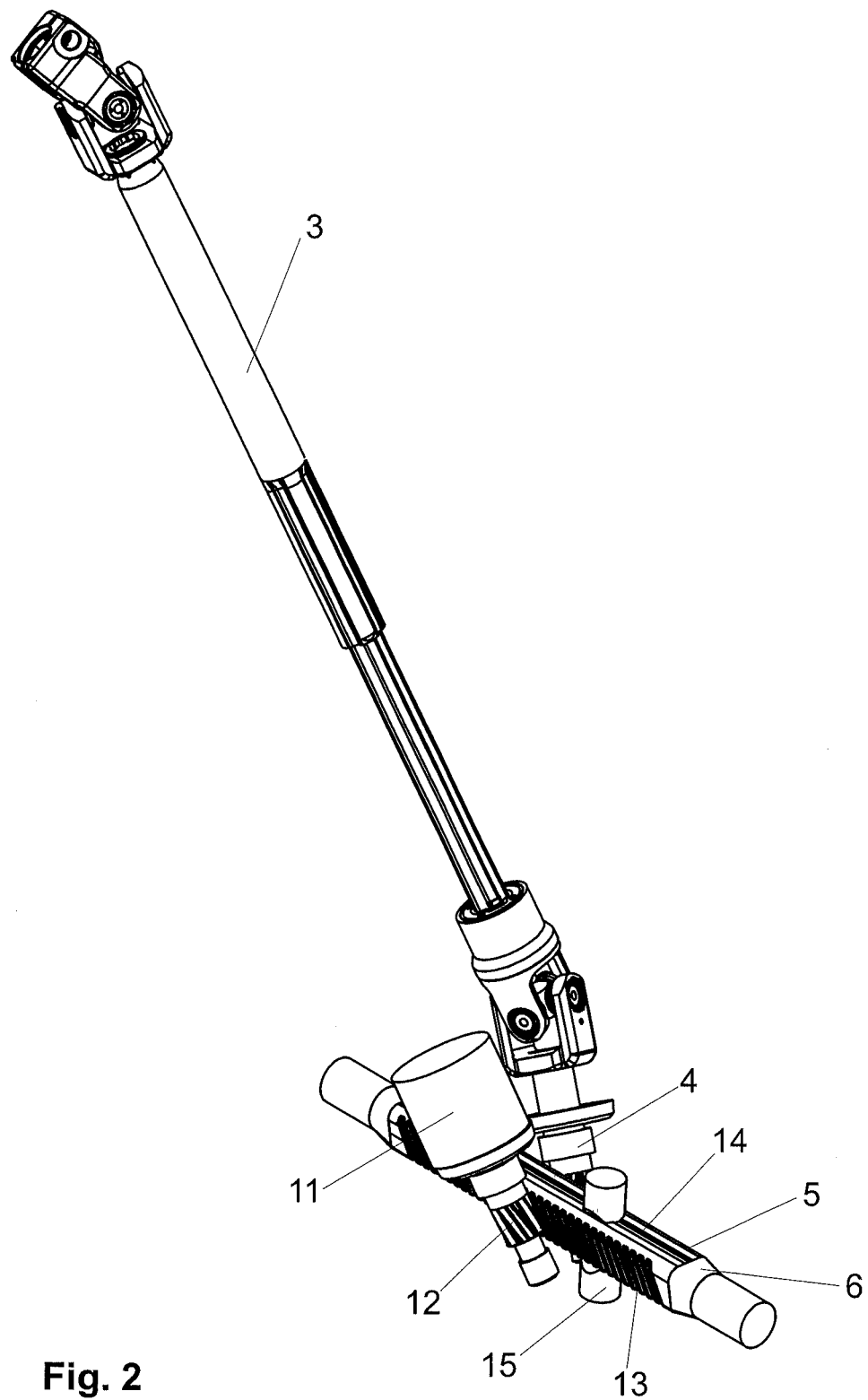
FIG. 2 is an enlarged view of the region of the steering gear from FIG. 1.

The gear region of the steering system from FIG. 1 is shown in more detail in FIG. 2. The steering rack 6 is provided with an approximately square cross section in the region of the mutually opposite toothed segments 5 and 13. The toothed segments 5 and 13 are arranged on two mutually opposite side faces of the steering rack 6. In this specific embodiment, the toothed segments 5 and 13 are inclined at an acute angle of approximately 10° to one another, so that the planes defined by the toothed segments 5 and 13 merge together, seen from the steering shaft 3 and the servomotor 2. Accordingly, the axes of rotation of the first pinion 4 and of the second pinion 2 are arranged at an acute angle to one another. The driven sides of the steering pinions 4 and 12, connected on the one hand to the steering shaft 3 and on the other to the servo drive 11, are at a greater distance from one another than the free ends of the steering pinions 4 and 12.

Between the toothed segments 5 and 13, the steering rack 6 has two mutually opposite guides 14 which are provided on the steering rack 6 in the form of longitudinal grooves approximately over the length of the toothed segments. The guides 14 extend approximately parallel to the toothed segments 5 and 13. Guide elements 15 which guide the steering rack 6 and are arranged in a stationary manner in the steering gear relative to the gear housing engage in the guides 14. The steering rack 6 is fixed by the guide elements 15 in its vertical alignment, i.e. in its position relative to the axes of rotation of the pinions 4 and 12. In this manner, the backlash of the tooth engagement between the first steering pinion 4 and the toothed segment 5 and also between the second steering pinion 12 and the toothed segment 13 can be set at zero. In this respect, the setting uses the approximately V-shaped orientation of the steering pinions 4 and 12 relative to one another.

Figure 3:
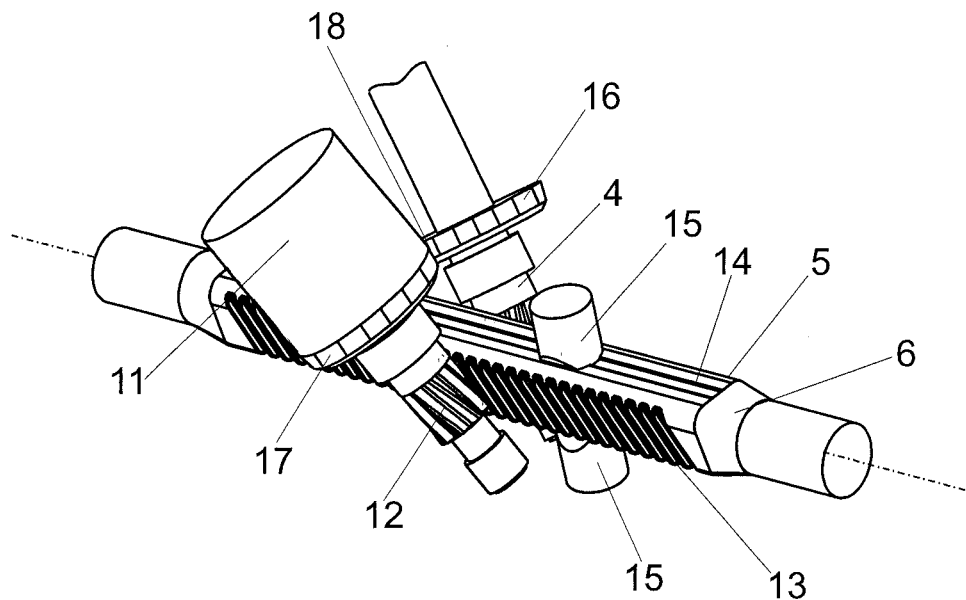
FIG. 3 is a further enlarged view of the steering gear from FIG. 2.

FIG. 3 shows the arrangement in a further enlarged view. Identical construction elements have been given identical reference numerals.

The first steering pinion 4 and the second steering pinion 12 must rotate in opposite directions during operation. A precisely synchronised movement is necessary for a precise drive of the steering rack 6. The rotational movements of pinions 4 and 12 should preferably not be synchronised by the steering rack 6, but by a separate synchronisation means. In this respect, FIG. 3 merely schematically shows that the steering pinion 4 is connected to a first bevel gear 16 for conjoint rotation, while the second steering pinion 12 is connected to a second bevel gear 17 for conjoint rotation. The bevel gears 16 and 17 mesh with one another approximately at reference numeral 18. They have the same circumference, so that the rotation angle speed of pinions 4 and 12 is identical. This is necessary for identically configured engagements between pinion 4 and toothed segment 5 on the one hand and between pinion 12 and toothed segment 13 on the other. In other embodiments, it is also possible to provide that the tooth engagements are configured differently on both sides of the steering rack 6, and in particular that the two pinions have a different circumference or pitch circle. In this case, synchronisation has to take place by correspondingly adapted bevel gears or by other synchronisation means.

Figure 4:
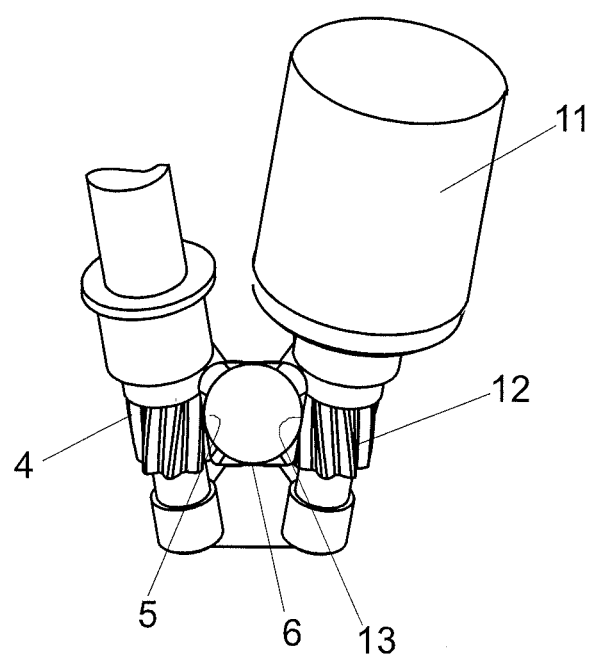
FIG. 4 is a view of the steering gear from FIG. 3 in the direction of the longitudinal axis of the steering rack.

Finally, FIG. 4 shows a schematic view of the steering gear, in which the longitudinal axis and direction of movement of the steering rack 6 are perpendicular to the plane of the drawing. In a particular configuration of the tooth engagements between the first steering pinion 4 and the first toothed segment 5 and between the second steering pinion 12 and the second toothed segment 13, it is possible to dispense with further guide means for the steering rack 6. In this case, the tooth engagements themselves produce the zero backlash of the gear due to the angular position of the rotational axes of pinions 4 and 12.

A preferred embodiment of the gear according to FIGS. 2 and 3 provides that the bevel gear 16 is mounted rigidly in the gear housing with the first steering pinion 4 and is connected to the steering pinion 4, while the mounting of the second bevel gear 17 and of the second steering pinion 12 is configured to move within narrow limits, thereby ensuring a variable axial distance between steering pinion 4 and steering pinion 12. The illustrated gear can then be kept free from backlash by a suitable spring system. As a result, the tolerances to be observed during production are increased, which simplifies production.

The motor vehicle steering preferably has a guide means 15 to guide the steering rack 6 and it guides the longitudinal displacement of the rack 6 to swivel the wheels 9. This guide means 15 is preferably configured such that it exerts a resilient pretensioning force on the rack 6 in order to pretension the engagement of the two tooth systems of the respective toothed segment 5 and 13 with the tooth systems of the two steering pinions 4 and 12 and thereby to reduce backlash. It is also conceivable and possible to adjust the pretension during assembly of the means by positioning the guide means 15 accordingly.

FIG. 5 shows a further preferred embodiment of the invention in which the basic construction conforms to the description relating to FIG. 3. In addition, provided in the moment flow between the servomotor 11 and the second steering pinion 12 is a spring element 100 which is configured as a torsion spring. In accordance with its spring constant, the spring element 100 allows a relative turning of the pinion 12 with respect to the shaft of the servomotor 11 subject to the prevailing torque. During operation, the spring element 100 causes only one of the two pinions 4, 12 to mesh with the steering rack 6, as long as the torque acting on the spring element 100 is low. The other pinion is also only engaged when the torque increases.

In detail, the steering gear according to FIG. 5 can be configured such that the steering pinion 4, connected to the steering shaft 3, does not mesh with the toothed segment 5 when at rest. The bevel gears 16 and 17 which couple the steering shaft 3 and the motor shaft of the servomotor 11, mesh without backlash, as do the second pinion 12 and the second toothed segment 13. Thus, when the steering wheel is turned with a low torque and with a low assisting power from the servomotor 11, the power flows from the steering shaft 3 via the bevel gears 16 and 17 onto the motor shaft and then via the pinion 12 onto the toothed segment 13. Pinion 4 does not mesh with the steering rack.

If a greater torque is exerted, the spring element 100 twists. The pinion 12 then lags behind the motor shaft. As a result, the position of the steering rack and particularly of the toothed segment 5 also changes relative to the pinion 4 which is rigidly coupled with the steering shaft 3. When the torque is high enough, the change in position becomes so great that the pinion 4 meshes with the toothed segment 5. It is now possible for greater moments and forces to be transmitted, because both tooth systems are meshing. Both tooth engagements are backlash-free due to the pretension produced by the spring element 100.

It is pointed out that the spring element 100 is not to be confused with a torsion bar, as is used in conventional torque sensors and rotary slide valves of power steering systems. These torsion bars have a lower spring constant and allow a greater relative rotation. The spring element 100, however, is more torsion-proof. The relative movement, enabled by this spring element 100, between the pinion 4 and the toothed segment 5 is within a range of from 0.01 to 0.1 mm.

FIG. 6 schematically shows a possible arrangement of spring elements. The view is chosen such that the longitudinal axis of the steering rack 6 is perpendicular to the plane of the drawing.

The steering wheel 1 is connected to the bevel gear 16 for conjoint rotation. A spring element 101 is provided between bevel gear 16 and pinion 4 which is coaxial therewith. The spring element 101 is preferably a torsion spring. The pinion 4 meshes with the toothed segment 5 of the steering rack 6. The bevel gear 16 meshes with the second bevel gear 17 which is connected to the motor shaft of the servomotor 11 for conjoint rotation. Spring element 100 is arranged between the bevel gear 17 and the pinion 12. Spring element 100 is preferably also a torsion spring. In turn, pinion 12 meshes with the toothed segment 13 which is opposite the toothed segment 5 and overlaps the toothed segment 5 in the axial direction, and is preferably arranged congruently.

From a construction point of view, it can be provided in this arrangement that backlash can occur in each of the three tooth engagements. This makes the production of the gear particularly simple and economical.

During operation, only one of the two pinions 4 and 12 will mesh with the associated toothed segment 5 and 13 in the power flow with a low torque. Therefore, a distinction should be made between the two cases which are described below:

1.: Pinion 4 meshes with toothed segment 5. In this case, there is a small backlash between the bevel gears 16 and 17 and also at the engagement of the pinion 12 in the toothed segment 13. When the torque increases, the spring element 101 twists. Bevel gear 16 comes into contact with bevel gear 17 and pinion 12 which, up until now, has been free of moment is urged against the flanks of the toothed segment 13 in the axial direction of the steering rack 6. With adequate torsion of the spring element 101, both pinions 4 and 12 then mesh with the respectively associated toothed segment 5 and 13. A higher torque can then be transmitted and all the tooth engagements are backlash-free.

2.: Pinion 12 meshes with toothed segment 13 and is subjected to the torque from the steering shaft 3 via the bevel gears 16 and 17. Pinion 4 has backlash. In this case, as the torque increases, the spring element 100 twists so that, for example, the steering shaft 3 can rotate with the unloaded pinion 4, while pinion 12 and thereby also the steering rack 6 rest. This rotational movement of pinion 4 can continue until its flanks mesh with the toothed segment 5. From this moment, the torque is transmitted via both pinions.

In this embodiment, it is thus not absolutely necessary for a specific tooth engagement to always be backlash-free from a construction point of view. Instead, as a result of wear, the effect of temperature and the like, the engagement conditions can change, without impairing operation.

FIG. 7 shows a possible embodiment with only one spring element 100, the position of the bevel gears and of the pinions being different compared to the other embodiments.

The lower steering shaft 3 is coupled with pinion 4 by a driver device (not shown). The driver device allows, for example, a rotational backlash of +/−6°, before a rotation-proof and positive entrainment of pinion 4 takes place when the steering shaft 3 is rotated.

Furthermore, the steering shaft 3 is connected to the bevel gear 16 in a torsionally rigid manner. Bevel gear 16 meshes with bevel gear 17 which is connected to the motor shaft of servomotor 11 by the spring element 100. In turn, the second pinion 12 is coupled in a torsionally rigid manner with the motor shaft.

Rotation of the steering shaft 3 initially does not produce a rotation of pinion 4, instead it produces a rotation of bevel gear 16 and a corresponding opposite rotation of bevel gear 17. The torque results in torsion of the spring element which is configured in this case with a spring rate of 1°/10 Nm. Thus, a torque of 10 Nm results in a torsion of the spring element 100 by 1°. After this torsion, pinion 12 is entrained in the rotational movement by bevel gear 17 and it drives the steering rack 6. Pinion 4 follows the steering rack 6 and twists freely in the driver device by 1° relative to the steering shaft 3.

When the torque on the steering shaft 3 reaches a value of 60 Nm, the spring element 100 is twisted by 6° and it engages the driver device to entrain pinion 4 with the steering shaft 3 in a rotationally rigid manner. One part of the torque of the steering shaft 3 is then directly transferred onto the steering rack 6 by pinion 4, while the other part acts on the steering rack 6 via the bevel gears 16 and 17, the spring element 100 and pinion 12. In addition, an assisting moment is applied by the servomotor 11 and it acts directly on pinion 12 from the motor shaft and also drives the steering rack 6 to assist the steering movement. In the described configuration, the torque is divided up such that a maximum of 60 Nm is transferred onto pinion 12 from the steering shaft 3. The remaining torque at the steering shaft 3 passes via pinion 4 onto the steering rack 6. However, pinion 12 also transfers the assisting moment of the servomotor 11 onto the steering rack. From a steering moment of 60 Nm, this arrangement is then backlash-free in all tooth engagements, and it is possible for a greater force to be transferred onto the steering rack by pinions 4 and 12 as well as by the associated toothed segments 5 and 13, than would be possible with only one pinion of comparable dimensions. This exemplary illustration of the distribution of the torques can also be used analogously for the embodiment according to FIGS. 5 and 6.

According to the illustrations in FIGS. 5, 6 and 7, the torsion springs 100, 101 are formed by a shaft portion, the torsional rigidity of which is lower than the torsional rigidity of the adjacent shaft portions. According to the drawings, this is illustrated by a simple tapering in diameter of the shaft. The use of separate construction elements which represent the function of the torsion spring is conceivable and possible.

It is possible to dispense with an expensive pressure piece in the illustrated steering gears compared to the prior art. In a conventional rack steering system, the pressure piece would be used where the engagement between the second steering pinion 12 and the second toothed segment 13 is arranged. On the one hand, the omission of the pressure piece presents a financial advantage during production and assembly of the steering system. On the other hand, omitting the pressure piece eliminates a potential source of noise.

The present invention is not restricted to embodiments in which the servo drive 11 is directly coupled with pinion 12. Instead, an electric servo drive can also act on the upper steering shaft 2, the lower steering shaft 3 or on pinion 4. In this case, a part of the torque acting on pinion 4 is transferred onto the second steering pinion by the tooth system between bevel gear 16 and bevel gear 17 or, when the axes of rotation of the pinions are parallel, it is transferred by corresponding spur gears, so that the torque engaging on the steering rack 6 is introduced by two tooth engagements. This construction makes it possible to select a steering configuration with a servomotor in the region of the steering column, which can apply particularly high assisting moments. Due to the arrangement of two mutually opposite steering pinions 4 and 12, a steering system of this type is also suitable for relatively heavy motor vehicles.

In a development of the invention, it is conceivable and possible to provide two servo drives, preferably electric motors, of which one servo drive (not shown in the figures) acts directly on the upper steering shaft 2 or on the lower steering shaft 3 or on the pinion 4, while the second servo drive 11 acts on the second pinion 12.

LIST OF REFERENCE NUMERALS

1. Steering wheel
2. Upper steering shaft
3. Lower steering shaft
4. Steering pinion
5. Toothed segment
6. Steering rack
7. Steering housing
8. Tie rods
9. Wheel
10. Carriageway
11. Servomotor
12. Steering pinion
13. Toothed segment
14. Guide
15. Guide element
16. Bevel gear
17. Bevel gear
100 Spring element
101 Spring element

What is claimed is:

1. A motor vehicle steering system comprising:
   a steering housing; and
   a steering rack mounted in the steering housing such that it can move in an axial direction of a longitudinal axis of the steering rack, the steering rack being actively connected to steerable wheels to swivel said wheels, the steering rack having a first toothed segment configured to mesh with a first steering pinion connected to a steering wheel for conjoint rotation by a steering shaft and having a second toothed segment and a second steering pinion configured to mesh with the second toothed segment, wherein the second toothed segment is arranged opposite the first toothed segment relative to the longitudinal axis of the steering rack and is arranged overlapping the first toothed segment in the axial direction of the longitudinal axis of the steering rack,
   wherein the first steering pinion is mechanically positively coupled with the second steering pinion for opposite rotation in a power flow acting independently of the steering rack, the system further including at least one spring element arranged between the first pinion and the second pinion.

2. The motor vehicle steering system according to claim 1, further comprising an electric servo drive configured to engage on the steering shaft.

3. The motor vehicle steering system according to claim 1, further comprising an electric servo drive configured to act on the first steering pinion or on the second steering pinion.

4. The motor vehicle steering system according to claim 1, further comprising an electric servo drive configured to engage on the second steering pinion.

5. The motor vehicle steering system according to claim 1, wherein the two steering pinions are coupled mechanically by spur gears or bevel gears.

6. The motor vehicle steering system according to claim 1, wherein the toothed segments are arranged in planes inclined relative to one another.

7. The motor vehicle steering system according to claim 1, further comprising at least one guide arranged in a region of the second toothed segment, wherein the at least one guide is configured to cooperate with at least one guide element to guide the steering rack in a direction of axes of rotation of the steering pinions.

8. A motor vehicle steering system comprising:
   a steering housing; and
   a steering rack mounted in the steering housing such that it can move in an axial direction of a longitudinal axis of the steering rack, the steering rack being actively connected to steerable wheels to swivel said wheels, the steering rack having a first toothed segment configured to mesh with a first steering pinion connected to a steering wheel for conjoint rotation by a steering shaft and having a second toothed segment and a second steering pinion configured to mesh with the second toothed segment, wherein the second toothed segment is arranged opposite the first toothed segment relative to the longitudinal axis of the steering rack and is arranged overlapping the first toothed segment in the axial direction of the longitudinal axis of the steering rack; and
   at least one spring element arranged between the first pinion and the second pinion,
   wherein the at least one spring element is a torsion spring.

9. The motor vehicle steering system according to claim 8, further comprising an electric servo drive configured to engage on the steering shaft.

10. The motor vehicle steering system according to claim 8, further comprising an electric servo drive configured to act on the first steering pinion or on the second steering pinion.

11. The motor vehicle steering system according to claim 8, further comprising an electric servo drive configured to engage on the second steering pinion.

12. The motor vehicle steering system according to claim 8, wherein the two steering pinions are coupled mechanically by spur gears or bevel gears.

13. The motor vehicle steering system according to claim 8, wherein the toothed segments are arranged in planes inclined relative to one another.

14. The motor vehicle steering system according to claim 8, further comprising at least one guide arranged in a region of the second toothed segment, wherein the at least one guide is configured to cooperate with at least one guide element to guide the steering rack in a direction of axes of rotation of the steering pinions.

15. A motor vehicle steering system comprising:
a steering housing; and
a steering rack mounted in the steering housing such that it can move in an axial direction of a longitudinal axis of the steering rack, the steering rack being actively connected to steerable wheels to swivel said wheels, the steering rack having a first toothed segment configured to mesh with a first steering pinion connected to a steering wheel for conjoint rotation by a steering shaft and having a second toothed segment and a second steering pinion configured to mesh with the second toothed segment, wherein the second toothed segment is arranged opposite the first toothed segment relative to the longitudinal axis of the steering rack and is arranged overlapping the first toothed segment in the axial direction of the longitudinal axis of the steering rack,
wherein axes of rotation of the two steering pinions are arranged at an acute angle to one another.

16. The motor vehicle steering system according to claim 15, wherein the toothed segments are arranged in planes inclined relative to one another.

17. The motor vehicle steering system according to claim 15, further comprising at least one guide arranged in a region of the second toothed segment, wherein the at least one guide is configured to cooperate with at least one guide element to guide the steering rack in a direction of axes of rotation of the steering pinions.

* * * * *